United States Patent
Lascaud et al.

(10) Patent No.: US 6,335,123 B1
(45) Date of Patent: Jan. 1, 2002

(54) SOLID POLYMER ELECTROLYTE AND MULTILAYER ELECTROCHEMICAL ASSEMBLY COMPRISING SUCH A SOLID POLYMER ELECTROLYTE

(75) Inventors: Stéphane Lascaud, Fontainebleau; Paul Baudry, Veneux les Sablons; Philippe Gramain, Saint Gely du Fosc, all of (FR)

(73) Assignee: Electricite de France (Servuce National), Paris (FR)

(*) Notice: Subject to any disclaimer, the term of this patent is extended or adjusted under 35 U.S.C. 154(b) by 0 days.

(21) Appl. No.: 09/319,916
(22) PCT Filed: Oct. 14, 1998
(86) PCT No.: PCT/FR98/02206
    § 371 Date: Jun. 16, 1999
    § 102(e) Date: Jun. 16, 1999
(87) PCT Pub. No.: WO99/20677
    PCT Pub. Date: Apr. 29, 1999

(30) Foreign Application Priority Data

Oct. 16, 1997 (FR) .................................................. 97 12952

(51) Int. Cl.⁷ ................................................ H01M 10/40
(52) U.S. Cl. ........................... 429/306; 429/316; 429/317
(58) Field of Search ................................... 429/306, 316, 429/317

(56) References Cited

U.S. PATENT DOCUMENTS

| | | | |
|---|---|---|---|
| 3,757,088 A | 9/1973 | Osborn | 219/553 |
| 4,822,701 A * | 4/1989 | Ballard et al. | 429/306 |
| 5,011,751 A * | 4/1991 | Yoneyama et al. | 429/317 |
| 5,622,792 A * | 4/1997 | Brochu et al. | 429/317 |
| 5,645,960 A * | 7/1997 | Scrosati et al. | 429/317 |

FOREIGN PATENT DOCUMENTS

| | | |
|---|---|---|
| EP | 0 004 087 | 9/1979 |
| EP | 0 657 484 | 6/1995 |
| JP | 02 235957 | 9/1990 |
| JP | 04 145145 | 5/1992 |

OTHER PUBLICATIONS

Chipara Et Al, *Polymer Degradation and Stability* vol. 57, pp. 211–217, 1997 (Month Unknown).*
Corciovei Et Al, *International Journal of Polymeric Materials*, vol. 13, pp. 137–146, 1990 (Month Unknown).*
Willis Et Al, *Rubber World*, Oct. 1965 Issue, pp. 88–97.*
Daiso Epichlorubber Company, Brochure for "Epichlomer" (Trade Name) pp. 1–9, Oct. 1996.*
Chemical Abstracts, vol. 125, No. 20, Nov. 11, 1996, Abstract No. 249230a.

* cited by examiner

*Primary Examiner*—Stephen Kalafut
(74) *Attorney, Agent, or Firm*—Jacobson Holman, PLLC

(57) ABSTRACT

A solid polymer electrolyte comprises a matrix formed, at least partially, (a) of crosslinked polymer comprising units derived from ethylene oxide and units derived from ethylene oxide substituted with a reactive radical by substitution, at least part of which participates in a crosslinking bond, and (b) of at least an inonizable alkaline salt chelated in said matrix. In addition, a multilayer electrochemical assembly (1) comprises a positive electrode (2) and a current collector (6) of the negative electrode (3) and optionally of its current collector (5), the electrodes being separated by a solid polymer electrolyte (4), as previously described.

21 Claims, 2 Drawing Sheets

SOLID POLYMER ELECTROLYTE AND MULTILAYER ELECTROCHEMICAL ASSEMBLY COMPRISING SUCH A SOLID POLYMER ELECTROLYTE

The present invention relates to novel solid polymeric electrolytes (SPEs) and to electrochemical assemblies fitted with such solid polymeric electrolytes.

Electrochemical assemblies fitted with aqueous electrolytes are well known. Examples of such assemblies comprise conventional Leclanché cells and Ni—Cd, Ni—Zn, Zn—$MnO_2$, Ni—$H_2$ and Pb acid cells. These assemblies typically comprise a positive electrode (cathode), a negative electrode (anode), a liquid aqueous electrolyte and a solid separator. The separator is present to prevent any discharging which might be brought about by contact between the two electrodes.

It is known that the presence of a separator entails certain drawbacks such as possible chemical incompatibility with the electrolyte, resulting in a reduction in the lifetime of the batteries, a decrease in the impedance of the electrochemical cell and the complexity of implementation.

Accordingly, it has for many years been proposed to replace liquid electrolytes with solid polymeric electrolytes, which have the advantage of dispensing with the separator. Many studies have been carried out in this respect.

Thus, an electrolyte of this type in which the matrix comprises, partly or totally, homo- and/or copolymers essentially containing non-crosslinked chains, derived from one or more monomers comprising a hetero atom capable of forming bonds of donor-acceptor type with the cation of the ionizable salt, is known from French patent No. 2,442,513.

However, the complex formed has a strong tendency to crystallize (reduction of the lability between chains), at a temperature below the melting point of the crystallites (generally at about 60° C.), which appreciably reduces the ionic mobility inside the network itself. Moreover, it cannot be easily cross-linked to prevent creep.

The consequence of this crystallization is an appreciable reduction in ionic conductivity, this reduction thus making it necessary to use these solid polymeric electrolytes above the melting point of the crystalline zones in order to obtain sufficient ionic conductivity.

It is also known, in particular from European patent application No. 0,037,776, to use crosslinked, in particular chemically crosslinked, polymers or oligomers to make the complexing polymer, these polymers or oligomers having a glass transition temperature which is as low as possible.

However, such polymers prove to be relatively unusable in the context of their applications at room temperature as solid electrolytes in electrochemical power sources on account of their low ionic conductivity and the instability of the crosslinking bonds with respect to the electrodes, in particular the negative electrode; this is particularly the case for di-, tri- or multiisocyanate chemical crosslinking bonds with respect to lithium which reduces them.

European patent application No. 0,078,505 describes a solid polymeric electrolyte formed from an ionizable salt, a complexing polymer and a polymer which is miscible with the said complexing polymer, and which is crosslinked, the complexing polymer being maintained in an essentially amorphous state during this crosslinking operation.

The complexing polymer is especially a polyether. The miscible polymer is especially an elastomer.

European patent application No. 0,119,912 describes a copolymer of ethylene oxide and of a second monomer unit chosen from substituted cyclic oxide ethers.

Other solid polymeric electrolytes have also been proposed.

U.S. Pat. No. 5,030,527 describes a polymer which is crosslinkable by radiation, such as acrylic polymers, vinyl alcohol polymers, epoxy polymers and polyimines.

European patent No. 0,657,484 describes a copolyether which can be crosslinked by radical means, comprising ethylenic substituents, which can be used for the preparation of a solid electrolyte.

U.S. Pat. No. 3,969,147 describes a solid polymeric electrolyte formed from a mixture of starch and crosslinked starch.

U.S. Pat. No. 5,424,150 describes a solid polymeric electrolyte formed from a copolymer of ethylene and of a saponified monomer ester of vinyl alcohol onto which a polyoxyethylene has been grafted.

The abstract from Japanese patent JO 2,235,957 describes a non-crosslinked solid electrolyte formed from an epichlorohydrin-ethylene oxide copolymer and from an alkali metal salt.

The abstract from Japanese patent JO 4,145,145 describes a liquid electrolyte impregnated into a rubber of the epichlorohydrin type.

SUMMARY OF THE INVENTION

Figure 1:
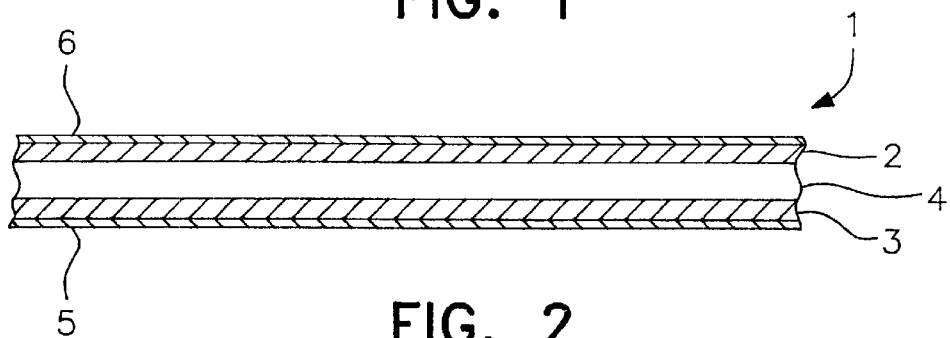
FIG. 1 represents a schematic cross sectional view of a multilayer assembly (1).

The object of the present invention is to propose a novel solid polymeric electrolyte with ionic conduction, which has high conductivity.

Another object of the present invention is to propose a solid polymeric electrolyte whose mechanical strength is improved by suppressing creep, while at the same time maintaining sufficient ionic conductivity.

It should be recalled, in this respect, that the ionic conductivity properties of the SPEs according to the invention do not bear any relation to the electronic conductivity properties of certain materials charged with carbon black, such as those described in U.S. Pat. No. 3,757,088.

Another object of the present invention is to propose a solid polymeric electrolyte whose chemical, mechanical and thermal degradations by cleavage of the chains, which may occur during the use of the electro-chemical storage system, are considerably slowed down. The lifetime of the electrochemical assembly is increased.

Another object of the present invention is to propose a solid polymeric electrolyte whose electrolyte crystallinity is eliminated or reduced, while at the same time retaining a low glass transition temperature. This makes it possible to lower the operating temperature of the electrochemical storage system and in particular its use at ambient temperature, while at the same time retaining good conductivity.

DETAILS

The invention relates firstly to a solid polymeric electrolyte, characterized in that it comprises, on the one hand, a matrix formed, at least partly, from crosslinked copolymer comprising units derived from ethylene oxide and units derived from ethylene oxide which are substituted with a radical which is reactive by substitution and at least some of which is involved in the crosslinking bonding, and, on the other hand, at least one ionizable alkaline salt complexed in the said matrix.

The expression "unit derived from ethylene oxide" means the unit —$CH_2$—$CH_2$—O—. The expression "radical which is reactive by substitution" means a radical bearing a reactive group which leaves under the action of a nucleophilic agent (nucleophilic substitution); mention is made, for example, of a chloromethyl, bromomethyl or iodomethyl radical.

Mention is also made of radicals of the type —CH=CH—$CH_2$Hal in which the double bond is stable during the crosslinking.

Other reactive groups which may be mentioned are SH, CN, OH, —$N_3$, pyridine, Pho, —AcO and $NO_3$.

The units derived from ethylene oxide substituted with a radical which is reactive by substitution and which is involved in the crosslinking bonding originate from the copolymerization, in particular with ethylene oxide, of monomers of formula:

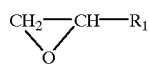
(I)

in which $R_1$ is thus, in particular, chloromethyl, bromomethyl or iodomethyl although $R_1$ can have other meanings as indicated above.

It should therefore be understood that the expression "units derived from ethylene oxide substituted with a radical which is reactive by substitution and at least some of which is involved in the crosslinking bonding" corresponds to the formula:

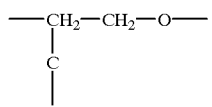
(II)

Crosslinking Bond or Free Reactive Radical

Besides the two abovementioned units, the crosslinked copolymer can comprise other units, in particular units derived from ethylene oxide substituted with a group similar to that which is involved in the crosslinking bond but which is in free form (cf. above formula). This means that, after crosslinking, taking the crosslinking conditions into account, these groups have not reacted. In the case in which the said groups are of the type $CH_2$Hal, they will preferably be converted into groups of low steric bulk such as amine or thioether.

However, mention may also be made of other groups which, by their nature, will be involved in ion transport and which, on account of their flexibility, will lower the Tg of the assembly and possibly their crystallinity to facilitate the implementation by extrusion. This is the case, for example, for groups comprising one or more alkylene oxides of the type ($CH_2$—$CH_2$O)$_n$.

Accordingly, polymers are obtained of low crystallinity or which are amorphous and comprising crosslinking bonds (mechanical property, stability) and bonds for "grafting" to monofunctional groups (substitution on the groups $R_1$ remaining and lowering of the Tg). The crosslinking agents and the monofunctional groups are thus chosen for their nucleophilic reactivity.

The term "copolymer" means that the polymer can comprise, besides the two units described above, one or more other different units. The term "copolymer" thus particularly includes terpolymers comprising units derived from ($C_3$-$C_6$) alkylene oxide, the $C_1$-$C_4$ alkyl radical allowing certain mechanical or thermal properties to be improved without substantially affecting the ionic conduction properties. Units which may be mentioned in particular are the propylene oxide derivative and the oxide derivatives in general of formula:

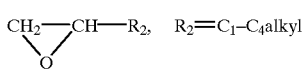
(III)

Preferably, the said crosslinked copolymer results from the crosslinking of a random copolymer of formula:

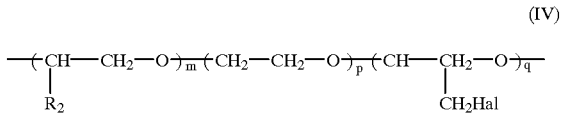
(IV)

Preferably, as a molar percentage:

p is between 50 and 97%, preferably 50 and 95%, q is between 3 and 50%, preferably 5 and 50%, m is between 0 and 10%.

Advantageously, as a molar percentage:

p is between 70 and 95% and q is between 5 and 30%.

The degree of crosslinking will have to be sufficient to ensure the cohesion and mechanical strength of the solid polymeric electrolyte and to prevent crystallization at room temperature, but it must not be too high, so as not to halt the mobility of the cations through the solid polymeric electrolyte.

It is preferable, for reasons of ionic conduction, to replace the remaining halogen atoms, in particular the chlorine, either before or after crosslinking, with a group of lower steric bulk, thus making it possible in particular to lower the glass transition temperature of the material (Tg), and which is capable in particular of complexing alkali metals. This will be, for example, a group of formula:

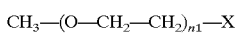
(V)

in which X is a nucleophilic group, for example X=SH, $NH_2$, pyridine, piperidine, piperazine or tosyl, and $n_1$=1 to 10.

Accordingly, when the proportion of units

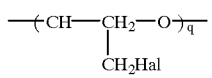

is greater than 20% (between 20 and 50%), the crosslinking, and in particular the amount of crosslinking agent, will be adapted such that, preferably, 5 to 20% of these units are involved in the crosslinking.

A preferred variant thus consists in preparing a copolymer of formula IV in which q is between 3 and 20% and p is between 80 and 97%, preferably 5 and 20% and 80 and 95%, respectively.

Preferably, the epihalohydrin is epichlorohydrin and Hal thus corresponds to a chlorine atom.

The crosslinking agent is advantageously chosen from the group of nucleophilic crosslinking agents which react with the radical $R_1$, preferably $CH_2Hal$ with release of halide acid, in particular HCl.

The crosslinking agent is usually di- or trifunctional or multifunctional.

Among the crosslinking agents, mention is made of crosslinking agents comprising at least two thiol functions, advantageously the trithiocyanuric acid sold in particular under the brand name Zysnet® and corresponding to the formula:

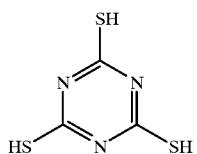

(VI)

or crosslinking agents comprising at least two amine functions, advantageously compounds such as bis (aminopropyl ether), in particular those of the type sold under the brand name Jeffamine®, and diaza crown ethers. All of these crosslinking agents are known to those skilled in the art.

Among the diamines, mention is made in particular of the diamines of formula $Y-(EO)_{n2}-Y$ in which Y is an $NH_2$, pyridine, piperazine or piperidine radical. The radical E is an ethylene or propylene radical. Mention is made in particular of the diamines in which $-(EO)_{n2}-$ is a polyethylene glycol-polypropylene glycol block chain, $n_2$ ranging from 5 to 20.

The crosslinking reaction is initiated thermally. The degree of crosslinking is controlled by the amount of crosslinking agents and the exposure temperature and time. Typically, in the presence of 0.1% of Zysnet or of Jeffamine®, the temperature range is between 100° C. and 200° C. and the duration of the treatment is between 5 and 20 minutes (in the case of Zysnet) or up to 60 minutes (Jeffamine®).

The electrolyte can comprise a crosslinking accelerator such as diphenyl guanidine or a crosslinking retardant such as N-(cyclohexylthio)phthalimide.

The electrolyte can also comprise a monofunctional additive preferably of the mercaptan type or of the amine type, which is capable of reacting with the crosslinking agent radicals which are in excess on the polymer chain during, before or after the crosslinking treatment. The additives will advantageously be chosen from those which allow the glass transition temperature of the material to be lowered and will furthermore be compounds comprising ethylene oxide sequences which complex the alkaline ions. In particular, the additive may advantageously be crystallizable, so as to facilitate the use of the material without overly affecting the mobility of the chains. This may be a primary amine substituted with a polyalkylene glycol chain.

The crosslinked copolymer preferably results from the crosslinking of the copolymer of formula IV with 1 to 10 mol of trivalent crosslinking agent per 1000 equivalents of halogen atoms.

According to another preferred variant, the crosslinked copolymer results from the crosslinking of the copolymer of formula IV with a proportion of diamine crosslinking agent such that the ratio: molar equivalent of radical which is reactive by substitution/molar equivalent of amine radical, is less than or equal to 1, preferably between 0.5 and 1.

The solid polymeric electrolyte also comprises other fillers, such as MgO, $Al_2O_3$, CaO, $Li_2CO_3$ and $CaCO_3$. Lithium or calcium carbonate is present to absorb the acid released, in particular the hydrochloric acid.

The electrolyte can also be charged with fibers or glass microbeads.

Among the anions associated with the alkali metal cations, mention is made in particular of perfluorosulfonates, perfluorosulfonate imides, $BF_4^-$, $PF_6^-$, $AsF_6^-$, $ClO_4^-$, $SCN^-$, $I^-$, $Br^-$, $(C_6H_5)_4B^-$ and derivatives thereof, and $BCl_4^-$. The solid polymeric electrolyte preferably comprises 1 to 100 g of ionizable alkaline salt per 100 g of copolymer, preferably between 2 and 20 g per 100 g of copolymer.

According to another method, the salt is incorporated into the electrolyte in an oxyethylene/alkaline cation molar proportion of between 5 and 100.

The metal cation is preferably a lithium cation.

According to one embodiment, the solid polymeric electrolyte films are prepared from copolymer containing all the other additives mentioned above, in particular one or more fillers, the crosslinking agent, optionally a crosslinking accelerator, and optionally an additive, preferably of the mercaptan or diamine type.

The ionizable alkaline salt is added to this mixture, and the film of polymeric electrolyte is then shaped, in particular by extrusion.

After shaping, the polymeric electrolyte is hot-calendered, followed by a grafting or thermal crosslinking reaction.

According to another embodiment, the above mixture is dissolved and then shaped by coating.

The film is deposited, either by coating or by extrusion at a thickness of between 20 $\mu$m and 100 $\mu$m, in particular.

The end of the crosslinking is monitored by tests of solubilization in a suitable solvent, in particular dichloromethane.

The crosslinking time and temperature are limited by the thermal stability of the copolymers. It is clearly understood that a person skilled in the art will be capable of determining the conditions specific to each copolymer.

Usually, this temperature must not exceed 200° C. and the crosslinking time will be from a few minutes up to 30 minutes, for example.

Care will be taken in particular to ensure that the content of crosslinking agent introduced into the films does not exceed the amount of halogen, in particular of chlorine, present in the copolymers. It is clearly understood that the degree of crosslinking will depend on the amount of crosslinking agent present and on the proportion of units derived from epihalohydrin in the copolymer.

In order to give an estimation of the degree of crosslinking, the degree of swelling (DS) of samples of the same size can be monitored in particular. The DS is defined by the formula: DS=$(M_1-M_0)/M_0$, $M_0$ and $M_1$ being the masses of the crosslinked film which is dry and wet with solvent, respectively.

Whereas the glass transition temperature of a polyethylene oxide is about −59° C., the glass transition temperatures of the solid polymeric electrolytes according to the present invention are generally less than −40° C. or even below −50° C., which is already a noteworthy property.

Whereas the degree of crystallinity of a polyethylene oxide is generally 60%, the degree of crystallinity of the solid polymeric electrolytes according to the invention is generally less than 40% and preferably between 0 and 30%.

The starting copolymers are prepared according to the methods which are well known to those skilled in the art. Specific embodiments are given in the examples described after this description. Needless to say, the invention is not limited to specific copolymers. Copolymers sold in particular under the brand names Hydrin or Epichlomer from the companies Zeon France or Siber Hegner & Cie France may be used.

The solid polymeric electrolytes according to the invention are noteworthy:

in that they have a conductivity of greater than $5 \times 10^{-6}$ and advantageously greater than $5 \times 10^{-5}$ S.cm$^{-1}$ at a temperature above 20° C., due in particular to the fact that the crystallization has been prevented on account of the presence of epihalohydrin-derived units in the copolymer, and possibly of $R_2$, in that they have mechanical properties and a dimensional and aging stability which are high due to the crosslinking process, in that the grafting of the crosslinking agent and/or the additive onto these units lowers the glass transition temperature.

The electrochemical properties are measured in a known manner and a measurement example is given in the examples below.

The invention also relates to a multilayer electrochemical assembly formed from a positive electrode and its current collector, the negative electrode and optionally its current collector, the said electrodes being separated by a solid polymeric electrolyte according to the invention.

In the case of the negative electrode, use may be made of any compound capable of releasing an ion of an alkali metal, preferably lithium, at its interface with the polymeric electrolyte.

The negative electrode can consist of lithium and, in this case, 5 a current collector is not associated with the said electrode.

According to one preferred variant, the positive electrode can consist of a composite material which is preferably substantially homogeneous, of the active material, of a compound which is inert to electron conduction and which promotes the transfer of the electrical charges to the collector, such as graphite (or acetylene black), and of the polymeric matrix according to the invention.

As regards the positive electrode, use will be made of any mixed compound or intercalating compound comprising compounds or salt of an alkaline transition metal which is of high electronic activity with regard to the alkali metals and capable of giving the latter, when they are in ionized form, a chemical potential which is weak with respect to that exhibited when it is in the metallic state.

According to one advantageous variant, the positive electrode is a composite electrode comprising carbon, an active material based on a transition metal and a matrix of a polymeric electrolyte.

Among the active materials, mention may be made advantageously of vanadium oxide, manganese oxide, nickel oxide, cobalt oxide or a mixture of these active materials.

In the attached FIG. 1, a multilayer assembly 1 in schematic cross section is formed from a solid polymeric electrolyte 4 sandwiched between a positive electrode layer 2 and a negative electrode layer 3, each electrode being coated with a collector, 5 and 6, respectively.

The examples below illustrate the invention and cannot in any way limit the scope of the invention.

A—Preparation of Copolymers of Solid Polymeric Electrolytes

EXAMPLE 1

Synthesis of Copolymer 1 comprising 85.4% of Units Derived from Ethylene Oxide (EO) and 14.6% of Units Derived from Epichlorohydrin (EC)

The synthesis was carried out in a reactor equipped with a stainless steel tank which can work under a maximum pressure of $15 \times 10^5$ Pa (15 bar), of the Buro type.

The ethylene oxide is supplied by British Petroleum (Lavera plant, France) and the epichlorohydrin is supplied by Merck.

The polymerization is carried out using the Vandenberg catalyst AlEt$_3$—0.5 H$_2$O—0.5 acetylacetone (AcAc) prepared in a known manner. The catalyst is in the form of a clear yellow solution.

The polymerization is a solution polymerization in toluene catalyzed by the AlEt$_3$—0.5 H$_2$O—0.5 AcAc system.

The solvent (toluene), the catalyst and then the epichlorohydrin are introduced via an inlet valve. The toluene is introduced via a funnel. To introduce the catalyst, the flask is placed under nitrogen. A positive pressure is thus created, preventing air from degrading the catalyst. A pipette and a propipette are also placed under nitrogen. The catalyst is then removed and placed in the reactor via the inlet valve. The same operation is carried out with the epichlorohydrin (stored in a flask under nitrogen).

The ethylene oxide (stored in a bottle, under pressure) is introduced using a capillary directly connected to the reactor. The amount of oxide introduced is monitored by means of a balance placed under the bottle.

Stirring is started (about 900 rpm) and the mixture is brought to a temperature of about 107° C. It is left to react and, after cooling, the viscous mixture is drawn off and the material drawn off is then processed.

The catalyst is deactivated using absolute ethanol. In theory, the stoichiometry is 3 alcohols per 1 aluminum. In practice, about 5 alcohols per 1 aluminum are added. An antioxidant is added and the material drawn off is precipitated in a petroleum spirit-ether mixture (the ether serves to extract the unreacted epichlorohydrin). The copolymer obtained is dried and has the following characteristics:

| | |
|---|---|
| units derived from ethylene oxide (in moles) | 85.4% |
| units derived from epichlorohydrin | 14.6% |
| Tg | −49° C. |
| Tm | 36° C. |
| % crystallinity | 13.5 |

EXAMPLE 2

Synthesis of Copolymer 2 Comprising 87.9% of Units Derived from Ethylene Oxide (EO) and 12.1% of Units Derived from Epichlorohydrin (EC)

Apart from the respective proportions of EO and EC, the preparation method is identical to that of Example 1.

Copolymer 2 has the following characteristics:

| | |
|---|---|
| units derived from ethylene oxide (in moles) | 87.9% |
| units derived from epichlorohydrin | 12.1% |
| Tg | −56° C. |
| ThL | 45.4° C. |
| % crystallinity | 13.6 |

EXAMPLE 3

Synthesis of Copolymer 3 Comprising 89.8% of Units Derived from Ethylene Oxide (EO) and 10.2% of Units Derived from Epichlorohydrin (EC)

Apart from the respective proportions of EO and EC, the preparation method is identical to that of Example 1.

Copolymer 3 has the following characteristics:

| | |
|---|---|
| units derived from ethylene oxide (in moles) | 89.8% |
| units derived from epichlorohydrin | 10.2% |
| Tg | −51.8° C. |
| Tm | 46° C. |
| % crystallinity | 11.5 |

EXAMPLE 4

This copolymer 4 is supplied by Zeon France (Hydrin 2000® and has the following characteristics:

| | |
|---|---|
| units derived from ethylene oxide (in moles) | 50% |
| units derived from epichlorohydrin | 50% |
| Tg | −39.3° C. |
| Tm | — |
| % crystallinity | — |

EXAMPLE 5

This copolymer 5 is supplied by Siber Hegner & Cie. France (Epichlomer D® and has the following characteristics:

| | |
|---|---|
| units derived from ethylene oxide (in moles) | 55.9% |
| units derived from epichlorohydrin | 44.1% |
| TG | −40.4° C. |
| Tm | — |
| % crystallinity | — |

B—Preparation of the Solid Polymeric Electrolyte Films

A solution of copolymer in acetonitrile is prepared and the following are added:

MgO, $CaCO_3$ or $Li_2CO_3$ as fillers, trithiocyanuric acid as crosslinking agent, lithium bis(trifluoromethyl)sulfonate amide of formula $(CF_3SO_2)_2N—Li^+$ abbreviated to LiTFSI.

The ratio between the crosslinking agent and the Cl content is 7.7/1000 in moles. The ratio: molar equivalent of $CO_3$/mole of crosslinking agent, is equal to 10/1. The ratio: molar equivalent of oxygen/mole of lithium, is equal to 20.

The films are prepared from solutions of the polymers all containing the additives.

The copolymers are dissolved in acetonitrile (1:10) and the LiTFSI is added. The inorganic additives and the crosslinking agent are dispersed in the same solvent by ultrasound. The dispersion is added to the solution and degassed under vacuum to remove the air which might give defects on the film. The solution is spread onto glass plates with Teflon paper using a microknife. After complete evaporation of the solvent, the films are crosslinked in a thermostatically-maintained oven. The end of crosslinking is monitored by tests of solubilization in dichloromethane.

The thermal properties (melting point, glass transition temperature, heat of fusion) of the polymers are studied by DSC (Perkin Elmer 4). The measurements were performed by carrying out a first heating of the samples from −90° C. to about +80° C., at a rate of 10° C./min, followed by rapid cooling (−260° C. to the starting temperature and a second heating (10° C./min) during which the thermograms were recorded. The melting points ($T_f$) are the temperatures corresponding to the crest of the endothermic melting peaks. The heats of fusion (AHf) were determined from the areas formed by the melting peaks and the baseline.

The degrees of crystallinity of the polymers were calculated relative to pure PEO treated under the same conditions, the heat of fusion of which is 199.9 J/or (47.8 cal/g). This value is selected as the reference for the 100% crystalline PEO. The values obtained make it possible to compare the crystallinity of the various polymers under uniform conditions.

The conditions for preparing the films and their properties are summarized below.

| | 1 | 2 | 3 | 4 | 5 |
|---|---|---|---|---|---|
| Copolymer (in g) | 10 | 10 | 10 | 20 | 20 |
| Acetonitrile (in ml) | 100 | 100 | 100 | 200 | 200 |
| MgO (in g) | — | — | — | — | — |
| $CaCO_3$ | — | — | — | — | — |
| $Li_2CO_3$ | 0.16 | 0.14 | 0.12 | 0.83 | 0.49 |
| Crosslinking agent (in g) | 0.039 | 0.033 | 0.028 | 0.2 | 0.12 |
| LiTFSI (in g) | 0.48 | 0.48 | 0.48 | 0.96 | 0.96 |
| Thickness (in μm) | 60 | 70 | 70 | 120 | 90 |
| Tg (in ° C.) | −49 | −56 | −51.8 | | |
| % of crystallinity | 13.5 | 13.6 | 11.5 | | |

Electrochemical Properties

The ionic conductivity of the films prepared is measured by impedance spectroscopy. This method makes it possible to separate the phenomena associated with the polymeric electrolytes and those associated with the electrolyte/electrode interfaces. The measurements are carried out on Li/electrolyte/Li cells (non-blocking electrodes) for polymers 1, 2, 3 and 5 and on stainless steel/electrolyte/stainless steel cells (blocking electrodes) for polymer 4, using alternating current at different temperatures and applying frequencies of between 10 mHz and 100 mHz.

The cells with lithium electrodes are manufactured in a glove box under dry air, by calendering under 5 bar at 180° C. The active surface in all cases is 7.07 cm². The thickness ranges between 40 and 100 μm, measured with an electronic sensor in the glove the dry films.

Figure 2:
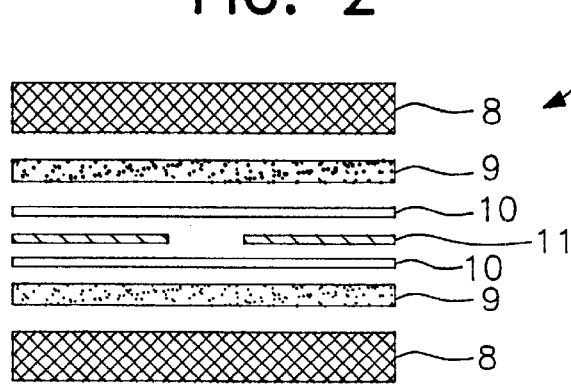
FIG. 2 represents a diagram of the cells (7) used for the study of the electrochemical properties of the electrolyte.

The attached FIG. 2 is a diagram of the cells 7 for this study:

8—nickel collector

9—lithium electrode

10—electrolyte
11—separator.

The results are given below:
R1: resistance in ohms
Rs: threshold resistance in ohms
conductivity of the electrolyte in $S.cm^{-1}$
total impedance in ohms.

Film of copolymer 1 - thickness 60 μm

| T (° C.) | R1 | Conductivity of the electrolyte | Total impedance | Rs |
|---|---|---|---|---|
| 20 | 25.1 | $3.4 \times 10^{-6}$ | 574 | 323 |
| 40 | 79.0 | $1.1 \times 10^{-5}$ | 133 | 54 |
| 60 | 39.0 | $2.2 \times 10^{-5}$ | 57 | 18 |
| 80 | 20.0 | $4.2 \times 10^{-5}$ | 24 | 4 |
| 90 | 15.0 | $5.7 \times 10^{-5}$ | 17 | 2 |

Film of copolymer 2 - thickness 70 μm

| T (° C.) | R1 | Conductivity of the electrolyte | Total impedance | Rs |
|---|---|---|---|---|
| 25 | | | | |
| 40 | 97.0 | $9.5 \times 10^{-6}$ | 156 | 59 |
| 60 | 25.0 | $3.7 \times 10^{-5}$ | 36 | 11 |
| 80 | 14.9 | $6.2 \times 10^{-5}$ | 18 | 3 |
| 90 | | | | 0 |

Film of copolymer 3 - thickness 70 μm

| T (° C.) | R1 | Conductivity of the electrolyte | Total impedance | Rs |
|---|---|---|---|---|
| 25 | 240 | $3.8 \times 10^{-6}$ | 574 | 334 |
| 40 | 58.0 | $1.6 \times 10^{-5}$ | 114 | 56 |
| 60 | 14.6 | $6.3 \times 10^{-5}$ | 27 | 12 |
| 80 | 9.0 | $1.0 \times 10^{-4}$ | 13 | 4 |
| 90 | 6.6 | $1.4 \times 10^{-4}$ | 8.4 | 2 |

Film of copolymer 4 - thickness 120 μm

| T (° C.) | Conductivity of the electrolyte |
|---|---|
| 60 | $2 \times 10^{-6}$ |
| 80 | $3.1 \times 10^{-5}$ |

Film of copolymer 5 - thickness 90 μm

| T (° C.) | R1 | Conductivity of the electrolyte | Total impedance | Rs |
|---|---|---|---|---|
| 60 | 337.0 | $3.8 \times 10^{-6}$ | 412 | 75.0 |
| 80 | 187.0 | $6.8 \times 10^{-6}$ | 196 | 9.0 |

Other films were made with copolymer 4 (cf. Example 4) with Jeffamine ED-600 [poly(propylene glycol-b-ethylene glycol-b-propylene glycol)]bis-(2-aminopropyl ether) with a molecular weight of about 600, as crosslinking agent, and LiTFSI as electrolyte salt. The molar ratio between the crosslinking agent and the Cl content ranges from 5% for film 4a to 12.5% for film 4b; to 25% for film 4c; to 50% for film 4d. That is to say:

film 4a made with copolymer 4 comprises 0.10 molar equivalent of amino radical per 1 molar equivalent of chlorine, film 4b made with copolymer 4 comprises 0.25 molar equivalent of amino radical per 1 molar equivalent of chloro, film 4c made with copolymer 4 comprises 0.50 molar equivalent of amino radical per 1 molar equivalent of chloro, film 4d made with copolymer 4 comprises 1 molar equivalent of amino radical per 1 molar equivalent of chloro.

The ratio: molar equivalent of $CO_3$/mole of crosslinking agent, is 3/1. The ratio: molar equivalent of oxygen in the copolymer/mole of lithium, is equal to 20.

This preparation is identical to the one described above.

The copolymer is dissolved in acetonitrile (1:10) and the electrolyte salt is added to the solution. The $Li_2CO_3$ is dispersed in the same solvent by ultrasound and the Jeffamine is added to this suspension, which is then poured into the copolymer solution. The solution is degassed under vacuum in order to remove the air which might give defects on the film, and it is then spread onto glass plates with Teflon paper using a microknife, and is left to dry in the open air. After complete evaporation of the solvent, the films are crosslinked in an oven thermostatically maintained for 60 minutes at 120° C. or for 30 minutes at 140° C.; the end of the crosslinking is monitored by tests of dissolution in dichloromethane.

Example

Preparation of Film 4c 5.601 g of copolymer ($3.7 \times 10^{-2}$ mol EP)
5.46 g of crosslinking agent ($9.1 \times 10^{-3}$ mol)
2.0 g of $Li_2CO_3$ ($2.73 \times 10^{-2}$ mol)
1.201 g of LiTFSI ([o]/[Li]=20)

Figure 3:
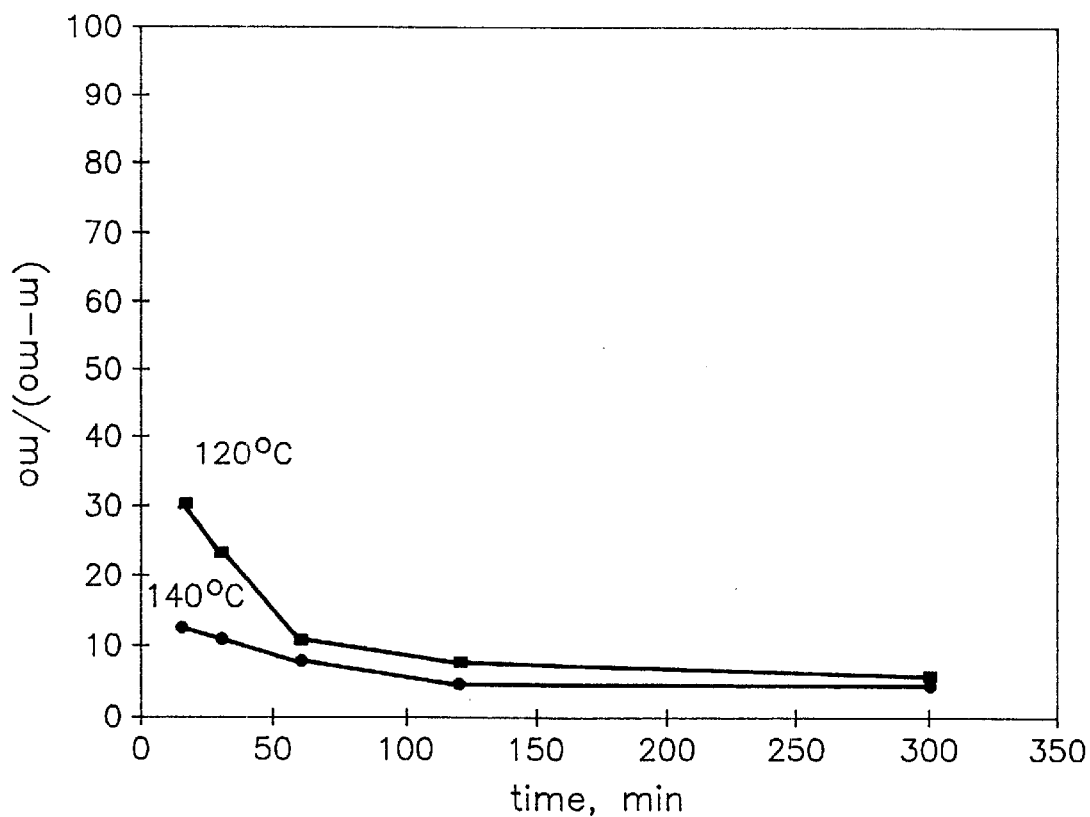
FIG. 3 shows the change in the degree of swelling in acetonitrile of the film 4c as a function of time and of the crosslinking temperature.

FIG. 3 (attached) shows the change in the degree of swelling in acetonitrile of this film as a function of time and of the crosslinking temperature.

Thermal Properties

Thermal analysis of the electrolyte films is carried out by differential scanning calorimetry on a Perkin Elmer 7 machine. The measurements were carried out under an inert atmosphere, by carrying out a first heating of the samples from −100° C. to +100° C., at a rate of 20° C./min, followed by rapid cooling to the starting temperature and a second or third heating to 20° C., during which the thermograms were recorded, allowing the determination of the glass transition temperatures (Tg), the melting points and the heats of fusion of the samples.

The table below summarizes the conditions for preparing the films and their characteristics.

|  | 4a | 4b | 4c | 4d |
|---|---|---|---|---|
| (OP) | 0.038 mol | 0.041 mol | 0.037 mol | 0.037 mol |
| Jeffamine ED-600 | 0.0019 mol | 0.0051 mol | 0.009 mol | 0.018 mol |
| $Li_2CO_3$ | 0.0054 mol | 0.0153 mol | 0.027 mol | 0.054 mol |
| LiTFSi (O/Li) | 20 | 20 | 20 | 20 |
| Thickness ($\mu$m) | 850–820 | 920–980 | 830–920 | 1451–1810 |
| Tg measured | −41.0° C. | −42.5° C. | −45.0° C. | −53.9° C. |
| Degree of crystallinity | 0 | 0 | 0 | 0 |

Figure 4:
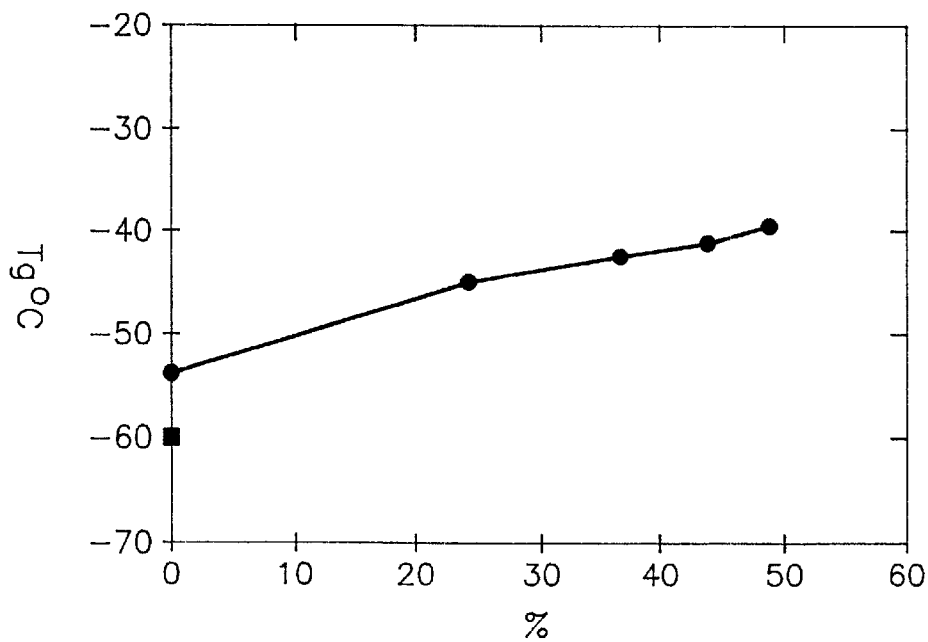
FIG. 4 shows the change in the glass transition temperature Tg of the electrolyte films 4a, 4b, 4c and 4d as a function of the theoretical amount of C1 remaining on the copolymer.

FIG. 4 shows the change in the glass transition temperature Tg of the electrolyte films prepared above as a function of the theoretical amount of Cl remaining on the copolymer. The non-crosslinked copolymer contains 50 mol % of chlorine.

The symbol ■ indicates the Tg of a salt-free reference film of polyethylene oxide.

Electrochemical Properties

The ionic conductivity of the polymeric electrolytes is evaluated by the complex impedance method widely used, since it allows the phenomena associated with the polymeric electrolyte to be separated from those associated with the electrolyte/electrodes interfaces. The measurements were carried out on a cell with blocking electrodes; it is designed so as to allow the removal of all traces of water and of volatile solvents, and maintenance of the vacuum during measuring. The sample 10 mm in diameter and of variable thickness is pressed between two polished stainless steel electrodes, placed in a tetrafluoroethylene sample holder which is arranged at the bottom of a leaktight cell. The plot of the complex impedance diagram is obtained by a Solartron 1260 transfer function analyzer (Schlumberger); the measurement frequency range is from 1 Hz to 1 Mhz.

The results of the measurements are given in the table below:

1. Film 4a (thickness: 0.036 cm; surface area: 1.43 cm$^2$)

| Temperature (° C.) | Resistance (ohms) | Conductivity (S·cm$^{-1}$) |
|---|---|---|
| 30 | 3.3 × 10$^3$ | 7.59 × 10$^{-6}$ |
| 40 | 1.2 × 10$^3$ | 2.08 × 10$^{-5}$ |
| 60 | 263.1 | 9.51 × 10$^{-5}$ |
| 80 | 93.9 | 2.66 × 10$^{-4}$ |
| 110 | 38.9 | 6.43 × 10$^{-4}$ |

2. Film 4b (thickness: 0.048 cm; surface area: 1.168 cm$^2$)

| Temperature (° C.) | Resistance (ohms) | Conductivity (S·cm$^{-1}$) |
|---|---|---|
| 30 | 4.39 × 10 | 9.43 × 10$^{-6}$ |
| 40 | 1.32 × 10 | 3.15 × 10$^{-5}$ |
| 60 | 362.8 | 1.14 × 10$^{-4}$ |
| 80 | 109.3 | 3.79 × 10$^{-4}$ |
| 110 | 42.6 | 9.73 × 10$^{-4}$ |

3. Film 4c (thickness: 0.085 cm; surface area: 0.84 cm$^2$)

| Temperature (° C.) | Resistance (ohms) | Conductivity (S·cm$^{-1}$) |
|---|---|---|
| 30 | 7.26 × 10$^3$ | 1.39 × 10$^{-5}$ |
| 40 | 2.8 × 10$^3$ | 3.61 × 10$^{-5}$ |
| 60 | 662 | 1.53 × 10$^{-4}$ |
| 80 | 239 | 4.22 × 10$^{-4}$ |
| 110 | 90.5 | 1.12 × 10$^{-4}$ |

4. Film 4d (thickness: 0.14 cm; surface area: 0.865 cm$^2$)

| Temperature (° C.) | Resistance (ohms) | Conductivity (S.cm$^{-1}$) |
|---|---|---|
| 30 | 2.83 × 10$^3$ | 5.72 × 10$^{-5}$ |
| 40 | 1.87 × 10$^3$ | 8.63 × 10$^{-5}$ |
| 60 | 585.3 | 2.76 × 10$^{-4}$ |
| 80 | 239.5 | 6.76 × 10$^{-4}$ |
| 110 | 102.0 | 1.59 × 10$^{-3}$ |

Figure 5:
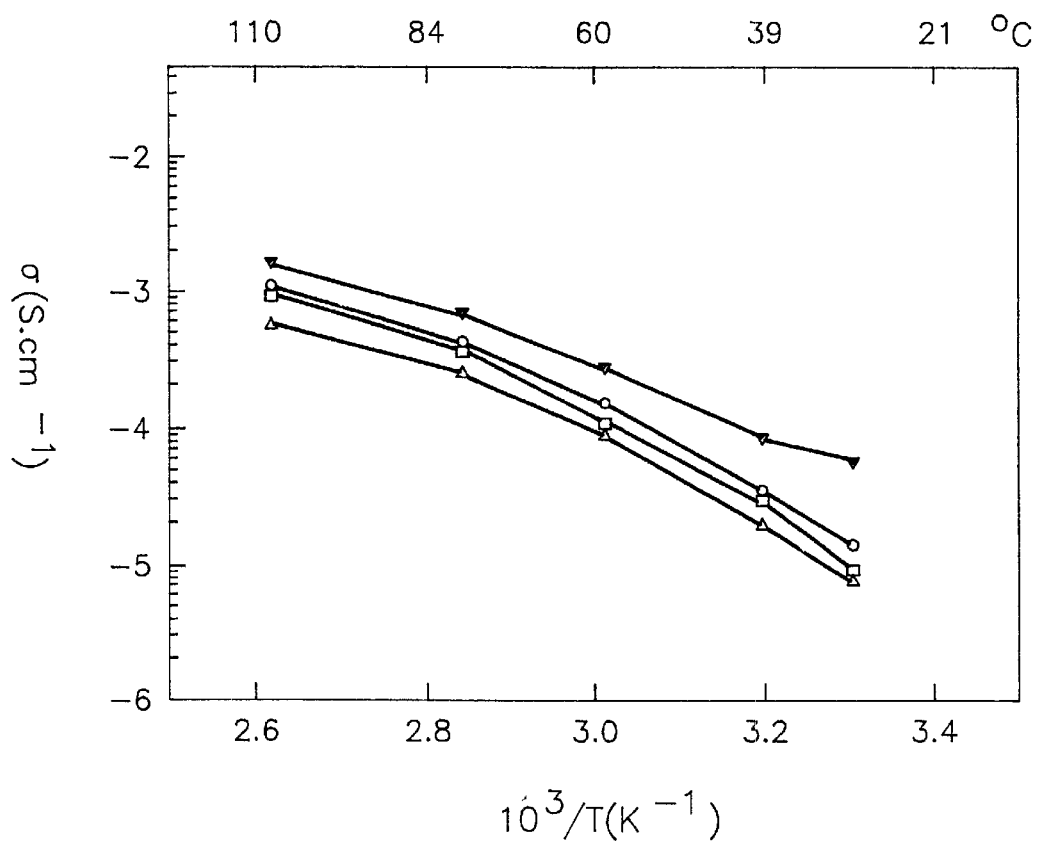
FIG. 5 shows the change in conductivity of the electrolyte films 4a, 4b, 4c and 4d as a function of the temperature in relation to the amount of crosslinking agent (Jeffamine ED600) introduced into the copolymer.

FIG. 5 shows the change in conductivity of the electrolyte films as a function of the temperature in relation to the amount of crosslinking agent (Jeffamine ED600) introduced into the copolymer.

▼4d
○4c
□4b
∆4a

What is claimed is:

1. Solid polymeric electrolyte, which comprises, on the one hand, a matrix constituted, at least partly, of crosslinked copolymer comprising units derived from ethylene oxide and units derived from ethylene oxide substituted with a radical which is reactive by substitution and at least some of which is involved in crosslinking bonding, and, on the other hand, at least one ionizable alkaline salt complexed in the said matrix.

2. Solid polymeric electrolyte according to claim 1, wherein the ethylene oxide substituted with a radical which is reactive by substitution and which is involved in the crosslinking bonding corresponds to the formula:

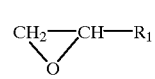

(I)

in which $R_1$ is a chloromethyl, bromomethyl or iodomethyl radical.

3. Solid polymeric electrolyte according to claim 2, wherein $R_1$ is chloromethyl radical.

4. Solid polymeric electrolyte according to claim 1, wherein said crosslinked copolymer results from crosslinking of a random copolymer of formula:

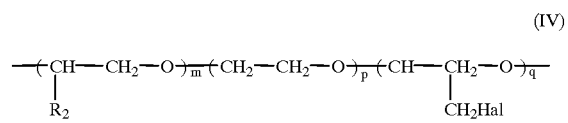

(IV)

wherein Hal is a chlorine, bromine or iodine atom;

$R_2$ is a $C_1$–$C_4$ alkyl radical;

p in molar percent is between 50 and 97%;

q in molar percent is between 3 and 50%; and m in molar percent is between 0 and 10%.

5. Solid polymeric electrolyte according to claim 4, wherein, as a molar percentage:

p is between 70 and 95%, q is between 5 and 30%, and m is between 0 and 10%.

6. Solid polymeric electrolyte according to claim 5, wherein, as a molar percentage:

p is between 80 and 95% q is between 5 and 20%.

7. Solid polymeric electrolyte according to claim 1 wherein said crosslinked copolymer results from the crosslinking of a random copolymer of formula:

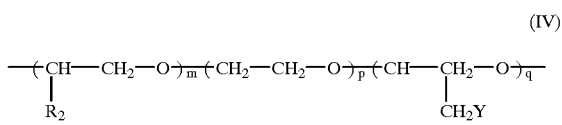

(IV)

wherein molar percentage of p is between 50 and 97%; that of q is between 3 and 50%; and that of m is between 0 and 10%; $R_2$ is a $C_1$–$C_4$ alkyl radical; and each Y is a chlorine, bromine or iodine atom, a part of which, not involved in crosslinking, is optionally replaced by a radical selected from the group consisting of an amine, a thioether radical, and a radical of the formula: $CH_3$—$(OCH_2{}^{CH}{}_2)_{n1}$—X, wherein X is a nucleophilic group and $n_1$= is a number from 1 to 10.

8. Solid polymeric electrolyte according to claim 4, resulting from the crosslinking of the copolymer with a crosslinking agent comprising at least two thiol functions, or with a crosslinking agent comprising two amine functions, optionally in the presence of a crosslinking accelerator or retardant.

9. Solid polymeric electrolyte according to claim 8, which results from the crosslinking of the copolymer with 1 to 10 mol of trivalent crosslinking agent per 1000 equivalents of halogen atoms.

10. Solid polymeric electrolyte according to claim 8, wherein the crosslinking agent is a diamine of formula Y—$(EO)_{n2}$—Y in which Y is an $NH_2$, pyridine, piperazine or piperidine radical, E is an ethylene or propylene radical and $n_2$ is between 5 and 20, and in that the crosslinked copolymer results from the crosslinking of the copolymer of formula IV with a proportion of diamine crosslinking agent such that the ratio: molar equivalent of radical which is reactive by substitution/molar equivalent of amine radical, is less than or equal to 1.

11. Solid polymeric electrolyte according to claim 1, wherein the glass transition temperature is less than or equal to $-40°$ C., the degree of crystallinity is less than 40% and the conductivity is greater than $5\times10^{-6}$ S.cm$^{-1}$ at 20° C. or more.

12. Solid polymeric electrolyte according to claim 1, wherein the anions associated with the alkali metal cations are chosen from the group consisting of perfluorosulfonates, perfluorosulfonate imides, $BF_4^-$, $PF_6^-$, $AsF_6^-$, $ClO_4^-$, $SCN^-$, $I^-$, $Br^-$, $(C_6H_5)_4B^-$ and $BCl_4^-$.

13. Solid polymeric electrolyte according to claim 12, wherein the metal cation is the lithium cation.

14. Solid polymeric electrolyte according to claim 1, wherein the matrix comprises one or more mineral fillers.

15. Solid polymeric electrolyte according to claim 14, wherein the mineral filler is chosen from the group consisting of MgO, $Al_2O_3$, CaO, $Li_2CO_3$, $CaCO_3$, glass in the form of fibers or microbeads, and a mixture of two or more of these fillers.

16. Solid polymeric electrolyte according to claim 1, which comprises a proportion, in grams, of ionizable alkaline salt of between 1 and 100 g per 100 g of copolymer.

17. A multilayer electrochemical assembly (1) having a positive electrode (2) and its current collector (6), a negative electrode (3) and, optionally, its current collector (5), said electrodes being separated by a solid polymeric electrolyte (4) according to claim 1.

18. A multilayer electrochemical assembly according to claim 17, wherein the positive electrode comprises a matrix having, on the one hand, at least partly, crosslinked copolymer comprising units derived from ethylene oxide and units derived from ethylene oxide substituted with a radical which is reactive by substitution and at least some of which is involved in the crosslinking bonding, and, on the other hand, at least one ionizable alkaline salt complexed in said matrix, an active material and a compound which is inert to electronic conduction.

19. Multilayer electrochemical assembly according to claim 17, wherein the negative electrode is constituted of a layer of lithium.

20. Solid polymeric electrolyte according to claim 8 wherein the crosslinking agent comprising at least two thiol functions is trithiocyanuric acid.

21. Solid polymeric electrolyte according to claim 8 wherein the crosslinking agent comprising two amine functions is of the bis(aminopropyl ether) type.

* * * * *

UNITED STATES PATENT AND TRADEMARK OFFICE
CERTIFICATE OF CORRECTION

PATENT NO.   : 6,335,123 B1  
DATED        : January 1, 2002  
INVENTOR(S)  : Lascaud et al.

It is certified that error appears in the above-identified patent and that said Letters Patent is hereby corrected as shown below:

Column 4,  
Line 35, formula IV should read:

Column 5,  
Lines 3 - 5, the formula should read:

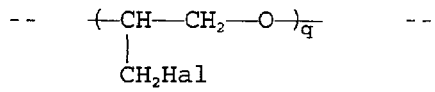

Claim 4,  
Formula IV should read:

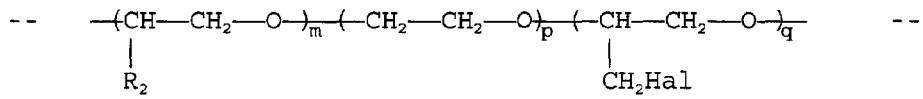

Claim 7,  
Formula IV should read:

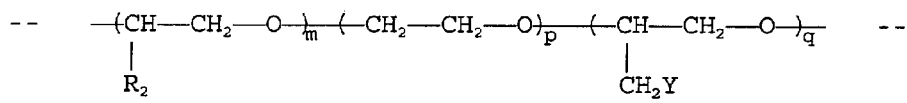

UNITED STATES PATENT AND TRADEMARK OFFICE
CERTIFICATE OF CORRECTION

PATENT NO.     : 6,335,123 B1
DATED          : January 1, 2002
INVENTOR(S)    : Lascaud et al.

It is certified that error appears in the above-identified patent and that said Letters Patent is hereby corrected as shown below:

<u>Claim 7,</u>
Line 31, the formula should read:

-- $CH_3-(OCH_2CH_2)_{n1}-X,$ --

Signed and Sealed this

Seventh Day of January, 2003

JAMES E. ROGAN
*Director of the United States Patent and Trademark Office*